(12) United States Patent
Ma et al.

(10) Patent No.: US 12,153,311 B2
(45) Date of Patent: *Nov. 26, 2024

(54) COUNTER SUBSTRATE AND DISPLAY PANEL

(71) Applicants: Hefei Xinsheng Optoelectronics Technology Co., Ltd., Anhui (CN); BOE Technology Group Co., Ltd., Beijing (CN)

(72) Inventors: Jian Ma, Beijing (CN); Jinliang Hu, Beijing (CN); Chengyong Zhan, Beijing (CN); Wenming Ren, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,550

(22) Filed: Oct. 23, 2023

(65) Prior Publication Data
US 2024/0053640 A1 Feb. 15, 2024

Related U.S. Application Data

(63) Continuation of application No. 17/955,849, filed on Sep. 29, 2022, now Pat. No. 11,835,826, which is a
(Continued)

(30) Foreign Application Priority Data
Dec. 25, 2020 (CN) .......................... 202023183906.1

(51) Int. Cl.
*G02F 1/1339* (2006.01)
*G02F 1/1335* (2006.01)

(52) U.S. Cl.
CPC .... *G02F 1/13394* (2013.01); *G02F 1/133512* (2013.01); *G02F 1/133514* (2013.01)

(58) Field of Classification Search
CPC ......... G02F 1/133514; G02F 1/133512; G02F 1/0107; G02F 1/13396; G02F 1/13394
See application file for complete search history.

(56) References Cited

U.S. PATENT DOCUMENTS

2006/0215105 A1* 9/2006 Hsiao .................. G02F 1/13394
349/155
2012/0008085 A1* 1/2012 Kim .................... G02F 1/13394
349/155
(Continued)

OTHER PUBLICATIONS

Non-Final Office Action mailed Mar. 18, 2022, for U.S. Appl. No. 17/358,052, filed Jun. 25, 2021, 15 pages.
(Continued)

*Primary Examiner* — Mariam Qureshi
(74) *Attorney, Agent, or Firm* — XSENSUS LLP

(57) ABSTRACT

The present disclosure relates to a counter substrate and display panel. The counter substrate includes a base substrate, PS pattern layer and alignment film. A surface of the PS pattern layer away from the base substrate is a support surface, and the PS pattern layer includes: main PSs in a display area and a peripheral barrier wall in a non-display area. The peripheral barrier wall has an elongated-strip shape and has a same length direction as a corresponding display area side, the support surface of the peripheral barrier wall is closer to the base substrate than that of the main PS, and a distance between the support surfaces of the peripheral barrier wall and main PS in a thickness direction is a first distance.

20 Claims, 3 Drawing Sheets

Related U.S. Application Data continuation of application No. 17/358,052, filed on Jun. 25, 2021, now Pat. No. 11,500,249.

(56) References Cited

U.S. PATENT DOCUMENTS

2015/0261030 A1     9/2015   Chen et al.
2019/0227391 A1*    7/2019   Kamitani .......... G02F 1/136286

OTHER PUBLICATIONS

Notice of Allowance mailed Jul. 6, 2022, for U.S. Appl. No. 17/358,052, filed Jun. 25, 2021, 8 pages.
Non-Final Office Action mailed May 2, 2023, for U.S. Appl. No. 17/955,849, filed Sep. 29, 2022, 13 pages.
Notice of Allowance mailed Aug. 15, 2023, for U.S. Appl. No. 17/955,849, filed Sep. 29, 2022, 8 pages.

* cited by examiner

COUNTER SUBSTRATE AND DISPLAY PANEL

CROSS-REFERENCE TO RELATED APPLICATIONS

This application is a continuation application of U.S. patent application Ser. No. 17/955,849, filed on Sep. 29, 2022, which is a continuation application of U.S. patent application Ser. No. 17/358,052 (Now U.S. patent Ser. No. 11/500,249), filed on Jun. 25, 2021, which is based upon and claims priority to Chinese Patent Application No. 202023183906.1, filed on Dec. 25, 2020, the entire contents thereof are incorporated herein by reference.

TECHNICAL FIELD

The present disclosure relates to the field of display technology, in particular, to a counter substrate and a display panel.

BACKGROUND

With the development of liquid crystal technology, high-quality, low-power and non-radiation thin film transistor-liquid crystal display panels (TFT-LCD) have become popular in the market. In a cell process of the liquid crystal display panel, the forming of an alignment film is a crucial process, which has a great impact on product yield and picture quality. However, at present, solution accumulation intends to occur in the process of forming the alignment film. In this case, uneven display brightness (Mura) or obvious yellowing phenomenon is prone to appear, which affects a product optical quality.

It shall be noted that the information disclosed in the background section above is only used to enhance the understanding of the background of the present disclosure, and therefore may include information that does not constitute the prior art known to those skilled in the art.

SUMMARY

The present disclosure provides a counter substrate and a display panel.

An aspect of the present disclosure provides a counter substrate including a display area and a non-display area arranged around the display area, wherein the counter substrate includes a base substrate, a photo spacer (PS) pattern layer formed on the base substrate and an alignment film covering the PS pattern layer, a surface of the PS pattern layer away from the base substrate is a support surface, and the PS pattern layer includes:

a plurality of main PSs, located in the display area, and each having a pillar shape; and at least one peripheral barrier wall, located in the non-display area and arranged at at least one side of the display area, the peripheral barrier wall having an elongated-strip shape and having a same length direction as that of a display area side, corresponding to the peripheral barrier wall, of the display area, the support surface of the peripheral barrier wall being closer to the base substrate than the support surface of the main PS, and a distance between the support surface of the peripheral barrier wall and the support surface of the main PS in a thickness direction of the base substrate being a first distance, wherein a ratio between a width of the support surface of the peripheral barrier wall and the first distance is less than 100.

In an exemplary embodiment of the present disclosure, the first distance is in a range of 0.2 μm to 0.5 μm.

In an exemplary embodiment of the present disclosure, the width of the support surface of the peripheral barrier wall is in a range of 10 μm to 15 μm.

In an exemplary embodiment of the present disclosure, the PS pattern layer further includes:

at least one peripheral PS group, arranged on the non-display area, the peripheral PS group being located at least at a side of the peripheral barrier wall close to the display area, wherein the peripheral PS group includes a plurality of peripheral PSs spaced apart from each other along the length direction of the peripheral barrier wall corresponding to the peripheral PS group, the peripheral PS has a pillar shape, and the support surface of the peripheral PS and the support surface of the peripheral barrier wall are in a same plane.

In an exemplary embodiment of the present disclosure:

a distance between at least part of the peripheral PSs in each of the at least one peripheral PS group and the peripheral barrier wall corresponding to the peripheral PSs is a second distance, and a ratio between the second distance and the first distance is greater than 400.

In an exemplary embodiment of the present disclosure, the second distance is in a range of 80 μm to 100 μm.

In an exemplary embodiment of the present disclosure, an orthographic projection of the peripheral barrier wall on the base substrate is a rectangle, and the distance between the peripheral barrier wall and each of the peripheral PSs in the peripheral PS group corresponding to the peripheral barrier wall.

In an exemplary embodiment of the present disclosure:

in the length direction of the peripheral barrier wall, two ends of the peripheral barrier wall are respectively flush with two ends of the display area side corresponding to the peripheral barrier wall, or the two ends of the peripheral barrier wall respectively extend beyond the two ends of the display area side corresponding to the peripheral barrier wall; and in the length direction of the peripheral barrier wall, two ends of each of the at least one peripheral PS group are respectively flush with the two ends of the peripheral barrier wall corresponding to the peripheral PS group, or the two ends of each of the at least one peripheral PS group respectively exceed beyond the two ends of the peripheral barrier wall corresponding to the peripheral PS group.

In an exemplary embodiment of the present disclosure, the at least one peripheral barrier wall and the at least one peripheral PS group are arranged on the non-display area at each display area side of the display area.

In an exemplary embodiment of the present disclosure, the PS pattern layer further includes:

a plurality of auxiliary PSs, located in the display area, the auxiliary PS having a pillar shape, and the support surface of the auxiliary PS being closer to the base substrate than the support surface of the main PS, wherein a number of the auxiliary PSs is greater than that of the main PSs.

In an exemplary embodiment of the present disclosure, in the length direction of the peripheral barrier wall, a distance between adjacent ones of the peripheral PSs is equal to that between adjacent ones of the auxiliary PSs.

In an exemplary embodiment of the present disclosure, in the thickness direction of the base substrate, thicknesses of the main PS, the peripheral PS, and the peripheral barrier wall are the same and greater than a thickness of the auxiliary PS.

In an exemplary embodiment of the present disclosure, the counter substrate further includes a black matrix pattern layer and a color filter layer, wherein
  the black matrix pattern layer is arranged between the base substrate and the PS pattern layer, and the color filter layer is arranged between the black matrix pattern layer and the PS pattern layer;
  orthographic projections of the peripheral barrier wall and the peripheral PSs on the base substrate are located in an orthographic projection of the black matrix pattern layer on the base substrate and outside an orthographic projection of the color filter layer on the base substrate; and
  orthographic projections of the main PSs and the auxiliary PSs on the base substrate are located in the orthographic projection of the black matrix pattern layer on the base substrate and in the orthographic projection of the color filter layer on the base substrate.

Another aspect of the present disclosure provides a display panel including the counter substrate described in any one of the above embodiments and an array substrate assembled together.

In an exemplary embodiment of the present disclosure:
  a part of the alignment film of the counter substrate corresponding to the main PS is in contact with the array substrate; and
  a gap is provided between a part of the alignment film of the counter substrate corresponding to the peripheral barrier wall and the array substrate.

In an exemplary embodiment of the present disclosure, the display panel further includes:
  a frame sealant, arranged between the counter substrate and the array substrate and in the non-display area, surrounding the display area, and located at a side of the peripheral barrier wall away from the display area; and
  liquid crystal, filled in an area enclosed by the frame sealant, the counter substrate and the array substrate.

Other characteristics and advantages of the present disclosure will become apparent through the following detailed description, or are partly learned through the practice of the present disclosure.

It should be understood that the above general description and the following detailed description are only exemplary and explanatory, which do not intend to limit the present disclosure.

BRIEF DESCRIPTION OF THE DRAWINGS

The drawings here are incorporated into the specification and constitute a part of the specification, show embodiments that conform to the present disclosure, and are used together with the specification to explain the principle of the present disclosure. Obviously, the drawings in the following description are only some embodiments of the present disclosure. For those skilled in the art, other drawings may be obtained based on these drawings without creative work.

DETAILED DESCRIPTION

Figure 1:
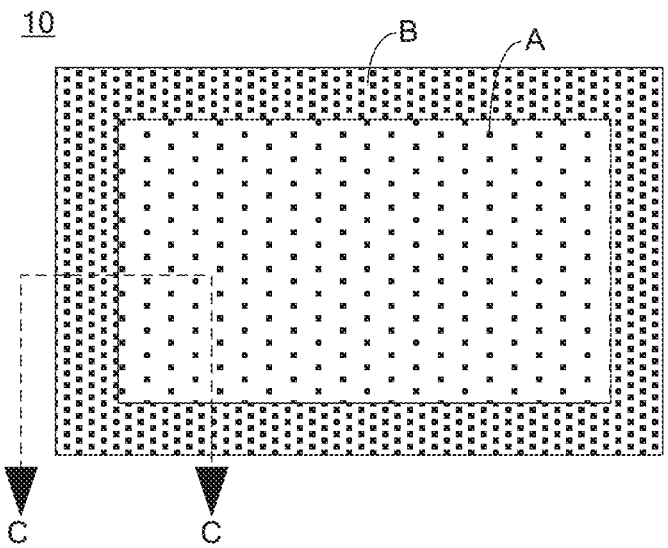
FIG. 1 shows a schematic structural diagram of a counter substrate according to an embodiment of the present disclosure.

The technical solution of the present disclosure will be further described below in detail through embodiments and in conjunction with the drawings. In the specification, same or similar reference numerals indicate same or similar components. The following description of the embodiments of the present disclosure with reference to the drawings is intended to explain the general idea of the present disclosure, and should not be construed as a limitation of the present disclosure.

In addition, for the convenience of explanation, many specific details are set forth in the following detailed description to provide a comprehensive understanding of the embodiments of the present disclosure. However, obviously, one or more embodiments may also be implemented without these specific details.

Unless otherwise defined, technical terms or scientific terms used in the present disclosure shall have the ordinary meanings understood by those skilled in the art to which the present disclosure belongs. Terms such as "first" and "second" used in the present disclosure do not indicate any order, quantity or importance, but are only used to distinguish different components.

Words such as "including", "comprising" and "having" used in the present disclosure mean that an element or item before the word covers elements or items listed after the word and equivalents thereof, but does not exclude other elements or items.

An embodiment of the present disclosure provides a counter substrate, which may be applied to a display panel, and specifically, to a liquid crystal display panel. As shown in FIG. 1, the counter substrate 10 may include a display area A and a non-display area B arranged around the display area A. The display area A and the non-display area B of the counter substrate 10 may also be understood to be a whole display area of the LCD panel.

The counter substrate 10 according to the embodiment of the present disclosure will be described in detail below with reference to the accompanying drawings.

Figure 2:
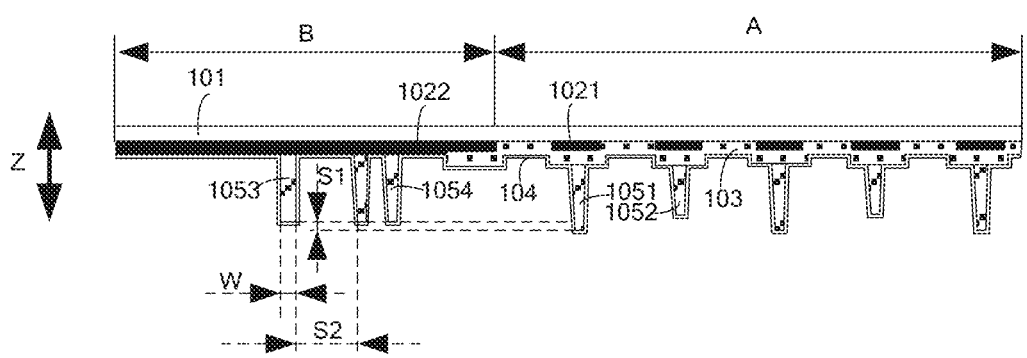
FIG. 2 shows a schematic cross-sectional view of the counter substrate taken along the line C-C in FIG. 1.

As shown in FIG. 2, the counter substrate 10 may include a base substrate 101, a black matrix pattern layer, a color filter layer 103, a photo spacer (PS) pattern layer, and an alignment film 104.

The base substrate 101 may be a single-layer structure with a material of glass, that is, the base substrate 101 may be a glass substrate, but the present disclosure is not limited thereto. The base substrate 101 is not limited to the single-layer structure, and may be a multi-layer structure, and the material of the base substrate 101 is not limited to glass, and may be other materials, which depends on specific situations. It should be understood that when the counter substrate 10 is manufactured, the display area A and the non-display area B may be divided on the base substrate 101 first, and then the display area A and the non-display area B are designed for facilitating subsequent manufacturing of various functional films/layers.

The black matrix pattern layer may be formed on the base substrate 101, and may be located in the display area A and the non-display area B. Specifically, as shown in FIG. 2, the black matrix pattern layer may be divided into two portions, which are a first shielding portion 1021 and a second shielding portion 1022 respectively. The main part of the first shielding portion 1021 may be located in the display area A, and the edge part of the first shielding portion 1021 may be located in the non-display area B to be connected with the second shielding portion 1022. However the present disclosure is not limited thereto, and the first shielding portion 1021 may also be completely located in the display area A, which depends on specific situations. Further, an orthographic projection of the first shielding portion 1021 on the base substrate 101 is in a grid shape, that is, the first shielding portion 1021 has a plurality of grid holes. The area corresponding to the grid holes in the first shielding portion 1021 may be understood as a light-transmitting area, and the remaining area may be understood as a shielding area. The second shielding portion 1022 may be located in the non-display area B, and the second shielding portion 1022 is designed to have no holes to shield the structure at the non-display area B.

The color filter layer 103 may be formed on a surface of the black matrix layer away from the base substrate 101. In other words, in the process of manufacturing the counter substrate 10, the black matrix pattern layer may be formed on the base substrate 101 first, and then the color filter layer 103 is formed on the matrix pattern layer. However, the present disclosure is not limited thereto, and the color filter layer 103 may also be formed first, and then the black matrix pattern layer is formed, which depends on specific situations.

As shown in FIG. 2, the main part of the color filter layer 103 is located in the display area A, and the edge part of the color filter layer 103 may be located in the non-display area B, so as to ensure the display effect where the display area A and the non-display area B are in contact with each other. For example, an orthographic projection of the color filter layer 103 on the base substrate 101 may completely cover an orthographic projection of the first shielding portion 1021 on the base substrate 101, and does not overlap with an orthographic projection of the second shielding portion 1022 on the base substrate 101. It should be understood that the color filter layer 103 may filter light, and the filtered light may be emitted through a light-transmitting area.

For example, the color filter layer 103 may include red, green, and blue color blocks to filter light into red, green, and blue light for display, but it should be understood that the color filter layer 103 is not limited to include the aforementioned red, green, and blue color blocks, and may also include color blocks of other colors such as yellow, which depends on specific situations.

In an embodiment of the present disclosure, since the first shielding portion 1021 of the black matrix pattern layer thereon is covered with the color filter layer 103, in order to reduce a cell thickness, the first shielding portion 1021 may be subjected to a thinning design. Since the second shielding portion 1022 is not covered with the color filter layer 103, the second shielding portion 1022 may not be needed to be subjected to the thinning design, that is, according to an embodiment of the present disclosure, the thickness of the first shielding portion 1021 may be smaller than the thickness of the second shielding portion 1022.

It should be noted that the thickness of each structure mentioned in the present disclosure refers to the dimension in a thickness direction Z of the base substrate 101. In addition, it should be noted that the counter substrate 10 according to an embodiment of the present disclosure may not be provided with the color filter layer 103 in FIG. 2, for example, the color filter layer 103 may be provided in an array substrate.

The PS pattern layer may be formed on the base substrate 101. Specifically, the PS pattern layer may be formed after the black matrix pattern layer and the color filter layer 103 are formed. For the convenience of the following description, the present disclosure defines the surface of the PS pattern layer away from the base substrate 101 as a support surface.

In an embodiment of the present disclosure, the PS pattern layer may include a plurality of pillar-shaped photo spacers (PSs) located in the display area A to maintain the uniformity of the cell thickness in the display area A and improve the tolerance of the display panel to the fluctuation of liquid crystal molecules, thereby improving the yield of the display panel.

It should be noted that the pillar-shaped structure mentioned in the present disclosure refers to a structure in which a maximum size and a minimum size of the cross-section thereof are equal or not much different. It should be understood that the cross-section mentioned in present disclosure is a plane which is perpendicular to the thickness direction Z of the base substrate 101.

Figure 3:
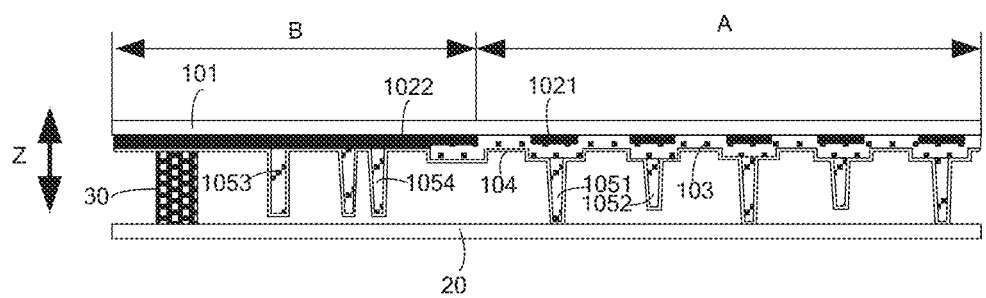
FIG. 3 shows a schematic diagram of a structure of the counter substrate shown in FIG. 2 and an array substrate after being assembled.
Figure 5:
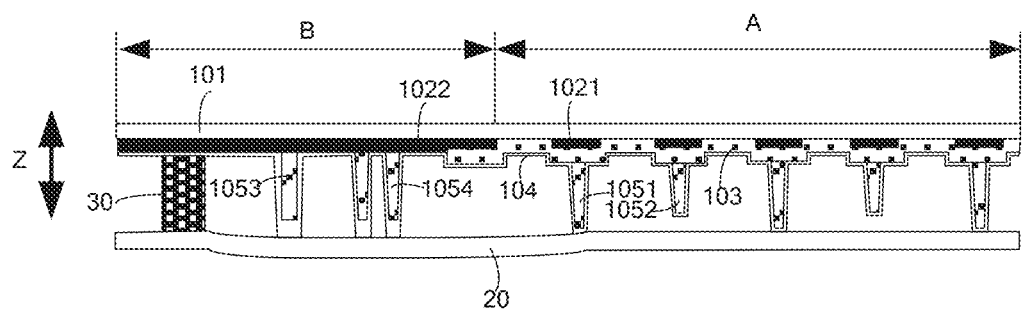
FIG. 5 shows a schematic structural diagram of a counter substrate according to yet another embodiment of the present disclosure.

As shown in FIG. 2, the plurality of pillar-shaped PSs located in the display area A may include a plurality of main PSs 1051 and a plurality of auxiliary PSs 1052. The support surface of the auxiliary PS 1052 is closer to the base substrate 101 that that of the main PS 1052. That is, after the counter substrate 10 including the main PS 1051 and the auxiliary PS 1052 and the array substrate 20 are assembled together, and when the display panel is not subjected to an external pressure, as shown in FIG. 5, the main PS 1051 may be supported on the array substrate 20 and compressed to 90% of the original thickness thereof, that is, corresponding to the center of the liquid crystal margin (LC Margin), so as to have a good supporting effect. When the display panel is not subjected to the external pressure, as shown in FIG. 3, there is a distance between the auxiliary PS 1052 and the array substrate 20; and when the display panel is subjected to the external pressure, the auxiliary PS 1052 participates in supporting the substrate, and thus effectively resists the external force and quickly recovers when the external force is removed.

In an embodiment of the present disclosure, the number of auxiliary PSs 1052 in the display area A may be greater than the number of main PSs 1051. Taking the counter substrate 10 divided into multiple cycles as an example, the ratio of the number of auxiliary PSs 1052 to the number of main PSs 1051 in each cycle is 50 to 100, such as 50, 60, 70, 80, 90, 100 and so on.

The dimension and height of different types of PSs in the display area A need to be monitored during the manufacturing process. Since the dimension of the PS is relatively small, and the number of the main PSs 1051 is generally small, it is difficult for a device to accurately identify the position of the main PS 1051 only depending on the dimension. Usually, a certain position around the main PS 1051 is designed to be vacant (i.e. without any PSs), to facilitate faster and more accurate identification of the position of the main PS 1051 for monitoring the same. For example, it may be designed that no PS is arranged below the main PS 1051. When monitoring, it may quickly determine the position where no PS is arranged, and then according to the aforementioned design rule, it may obtain that the PS at the position above the position with no PS is the main PS 1051.

For example, according to an embodiment of the present disclosure, the orthographic projections of the main PS 1051 and the auxiliary PS 1052 on the base substrate 101 may be located in the orthographic projection of the black matrix pattern layer on the base substrate 101, and located in the orthographic projection of the color filter layer 103 on the base substrate 101.

The distance between the main PS 1051 and the base substrate 101 in the thickness direction Z may be equal to that between the auxiliary PS 1052 and the base substrate 101 in the thickness direction Z. In such case, in order that the support surface of the auxiliary PS 1052 is closer to the base substrate 101 than the support surface of the main PS 1051, the thickness of the auxiliary PS 1052 may be designed to be smaller than the thickness of the main PS 1051. It should be understood that when the distance between the main PS 1051 and the base substrate 101 is not equal to that between the auxiliary PS 1052 and the base substrate 101, the thickness of the auxiliary PS 1052 may also be designed to be equal to the thickness of the main PS 1051, as long as the support surface of the auxiliary PS 1052 is closer to the base substrate 101 than the support surface of the main PS 1051, and the distance between the support surface of the auxiliary PS 1052 and the support surface of the main PS 1051 in the thickness direction Z of the base substrate 101 satisfies the requirement.

Optionally, the distance between the support surface of the main PS 1051 and the support surface of the auxiliary PS 1052 in the thickness direction Z of the base substrate 101 may be 0.5 µm or less, that is, a step difference between the main PS 1051 and the auxiliary PS 1051 may be 0.5 µm or less. However, the present disclosure is not limited thereto, and it may be determined according to actual needs.

For example, according to an embodiment of the present disclosure, the orthographic projections of the main PS 1051 and the auxiliary PS 1052 on the base substrate 101 may be circular. However, the present disclosure is not limited thereto, and the orthographic projections thereof may also be elliptical, rectangular, hexagonal, octagonal and the like. Further, the cross-sectional areas of the main PS 1051 and the auxiliary PS 1052 gradually decrease in the direction away from the base substrate 101, that is, the support surface area of the main PS 1051 is the minimum cross-sectional area thereof, and the support surface area of the auxiliary PS 1052 is the minimum cross-sectional area thereof, and the center lines of the main PS 1051 and the auxiliary PS 1052 extend in the thickness direction Z of the base substrate 101. That is, the main PS 1051 and the auxiliary PS 1052 may respectively have a circular truncated cone structure as a whole.

In an embodiment of the present disclosure, the widths of the support surfaces of the main PS 1051 and the auxiliary PS 1052 may respectively be 10 µm to 30 µm, such as 10 µm, 15 µm, 20 µm, 25 µm, 30 µm, and the like. It should be understood that as mentioned above, the main PS 1051 and the auxiliary PS 1052 are pillar-shaped structures. Therefore, it can be known that the widths of the support surfaces of the main PS 1051 and the auxiliary PS 1052 in all directions may be equal or not much different.

It should be noted that according to an embodiment of the present disclosure, when the display panel is a liquid crystal display panel, the display area A is mainly supported by the liquid crystal and the aforementioned pillar-shaped PSs, and the non-display area B is mainly supported by the liquid crystal and the frame sealant. However, since the distance between the frame sealant and the display area A is relatively large, usually about 1000 µm, that the non-display area B is only supported by the frame sealant and the liquid crystal support may easily cause an uneven cell thickness.

In view of the above, according to an embodiment of the present disclosure, as shown in FIG. 2, the PS pattern layer may be designed to include at least one peripheral barrier wall 1053 in addition to the aforementioned main PS 1051 and the auxiliary PS 1052. The peripheral barrier wall 1053 may be located in the non-display area B and arranged at at least one side of the display area A. The support surface of the peripheral barrier wall 1053 is closer to the base substrate 101 than the support surface of the main PS 1051, so as to function as auxiliary support for the non-display area B. and thus prevent the yellowing phenomenon around the display area A due to the uneven cell thickness in the non-display area B and improve the picture quality. That is, after the counter substrate 10 including the peripheral barrier wall 1053 and the array substrate 20 are assembled together, and when the display panel is not subjected to an external pressure, the main PS 1051 may be supported on the array substrate 20 and compressed to 90% of the original thickness thereof, so as to have a good supporting effect. When the display panel is not subjected to the external pressure, as shown in FIG. 3, there is a distance between the peripheral barrier wall 1053 and the array substrate 20; and when the display panel is subjected to the external pressure, the peripheral barrier wall 1053 participates in supporting the substrate, and thus effectively resists the external force and quickly recovers when the external force is removed.

It should be understood that as shown in FIG. 3, according to an embodiment of the present disclosure, the peripheral barrier wall 1053 may be located at least at the side of the frame sealant 30 close to the display area A.

Figure 4:
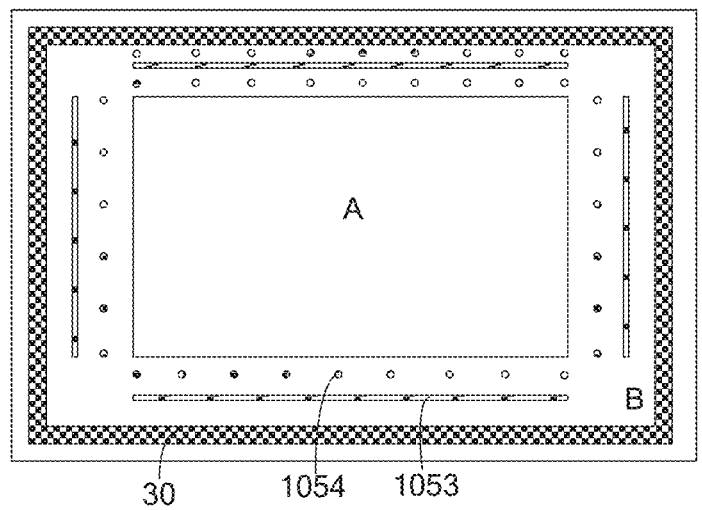
FIG. 4 shows a schematic structural diagram of a counter substrate according to another embodiment of the present disclosure.

For example, as shown in FIG. 4, the peripheral barrier wall 1053 may have an elongated-strip shape with the same length direction as that of a corresponding display area side in the display area A. Such design may improve the auxiliary support of the peripheral barrier wall 1053 to the display area B, and at the same time, may effectively prevent the pollution of the liquid crystal due to the contact with the before-curing frame sealant 30.

In order to further improve the auxiliary support of the peripheral barrier wall 1053 to the non-display area B and further effectively prevent the pollution of the liquid crystal due to the contact with the before-curing frame sealant 30, in an embodiment of the present disclosure, in the length direction of the peripheral barrier wall 1053, two ends of the peripheral barrier wall 1053 may be flush with two ends of the corresponding display area side respectively; optionally, the two ends of the peripheral barrier wall 1053 may extend beyond the two ends of the corresponding display area side respectively. In other words, the two ends of the peripheral barrier wall 1053 may be farther away from the center of the display area side than the two ends of the corresponding display area side. However, the present disclosure is not limited thereto, for example, one end of the peripheral barrier wall 1053 may be flush with one end of the corresponding display area side and the other end of the peripheral barrier wall 1053 may extend beyond the other end of the corresponding display area side, which depends on specific situations, as long as the peripheral barrier wall 1053 may provide the auxiliary support for the non-display area B. and at the same time, also effectively prevent the pollution of the liquid crystal due to the contact with the before-curing frame sealant 30.

For example, in order to ensure the auxiliary support at the entire non-display area B, the aforementioned peripheral barrier wall 1053 may be arranged on the non-display area B at each display area side of the display area A. As shown in FIG. 4, there is an interval (i.e., no connection) between the peripheral barrier walls 1053 corresponding to adjacent display area sides.

It should be noted that the display area side of the display area A mentioned in the embodiment of the present disclosure refers to the boundary between the display area A and the non-display area B. Moreover, the elongated-strip shape structure mentioned in the embodiment of the present disclosure means that the cross-section thereof includes four sides connected end to end in turn, and the four sides include two short sides opposite to each other in a first direction and two long sides opposite to each other in a second direction perpendicular to the first direction. The distance between the two short sides in the first direction may be defined as a length, the distance between the two long sides in the second direction may be defined as a width, and the structure with the length much larger than the width is the elongated-strip shape structure. The aforementioned first direction may be the length direction of the elongated-strip shape structure, and the second direction may be the width direction of the elongated-strip shape structure.

In addition, it should be noted that the short sides of the elongated-strip shape structure in the embodiment of the present disclosure may be linear, however, the present disclosure is not limited thereto, and it may also be arc-shaped as a whole, or a part thereof is linear and a part thereof is arc-shaped. Similarly, the long sides of the elongated-strip shape structure may be linear, but the present disclosure is not limited thereto, and it may be arc-shaped as a whole, or a part thereof is linear and a part thereof is arc-shaped.

For example, according to an embodiment of the present disclosure, the display area A as a whole may be rectangular, that is, the display area A may be formed by connecting four linear display area sides end to end. In view of the above, according to an embodiment of the present disclosure, the peripheral barrier wall 1053 may be designed to have a rectangle orthographic projection on the base substrate 101, that is, the four sides of the cross-section of the peripheral barrier wall 1053 may be designed to be linear. However, it should be understood that according to an embodiment of the present disclosure, the orthographic projection of the peripheral barrier wall 1053 on the base substrate 101 is not limited to a rectangle, and the two long sides thereof also be designed to be at least partially curved.

In the direction away from the base substrate 101, the cross-sectional area of the peripheral barrier wall 1053 remains unchanged, and the center line of the peripheral barrier wall 1053 extends in the thickness direction Z of the base substrate 101, that is, the peripheral barrier wall 1053 is a rectangular block as a whole.

In an embodiment of the present disclosure, the orthographic projection of the peripheral barrier wall 1053 on the base substrate 101 may be located in the orthographic projection of the black matrix pattern layer on the base substrate 101 and outside the orthographic projection of the color filter layer 103 on the base substrate 101. Since the orthographic projection of the peripheral barrier wall 1053 on the base substrate 101 does not overlap with the orthographic projection of the color filter layer 103 on the base substrate 101, that is, the standing position of the peripheral barrier wall 1053 on the base substrate 101 is lower than the standing positions of the main PS 1051 and the auxiliary PS 1052 on the base substrate 101, in order to reduce the process design difficulty of the PS pattern layer, the peripheral barrier wall 1053 may be designed to have a same thickness as that of the main PS 1051 or the auxiliary PS 1052. However, since the auxiliary PS 1052 and the main PS 1051 themselves have a step difference of about 5 µm, and the peripheral barrier wall 1053 has a lower standing position, if the peripheral barrier wall 1053 is designed to have the same thickness as that of the auxiliary PS 1052, the step difference between the peripheral barrier wall 1053 and the main PS 1051 would be further increased, which will seriously weaken the auxiliary supporting effect of the peripheral barrier wall 1053. Therefore, in an embodiment of the present disclosure, the peripheral barrier wall 1053 may be designed to have the same thickness as that of the main PS 1051, which may ensure the auxiliary supporting effect of the peripheral barrier wall 1053, and at the same time, may reduce the mask cost and the difficulty of production and management of the PS pattern layer.

In an embodiment of the present disclosure, the distance between the support surface of the peripheral barrier wall 1053 and the support surface of the main PS 1051 in the thickness direction Z of the base substrate 101 may be a first distance S1, as shown in FIG. 2, the first distance S1 may be 0.2 µm to 0.5 µm, for example, 0.2 µm, 0.3 µm, 0.4 µm, 0.5 µm, and the like, so that the supporting performance thereof may meet the requirements.

It should be noted that usually, the display area A may be subjected to an external pressure greater than that on the non-display area B. Therefore, in order that the auxiliary PS 1052 and the peripheral barrier wall 1053 may substantially simultaneously participate in supporting the substrate when the substrate is subjected to the external pressure so that the uniformity of the entire cell thickness may be ensured, in an embodiment of the present disclosure, the support surface of the auxiliary PS 1052 may be slightly closer to the base substrate 101 than the support surface of the peripheral barrier wall 1053. However, the present disclosure is not limited thereto, the support surface of the peripheral barrier wall 1053 may also be flush with the support surface of the auxiliary PS 1052, that is, the distance between the support surface of the peripheral barrier wall 1053 and the base substrate 101 in the thickness direction Z is equal to the distance between the support surface of the auxiliary PS 1052 and the base substrate 101 in the thickness direction Z, which depends specific situations, as long as when the display panel is not subjected to the external pressure, it may ensure that there is a certain distance between the auxiliary PS 1052 and the peripheral barrier wall 1053 and the array substrate 20, so as to prevent the yellowing phenomenon around the product due to the uneven cell thickness caused by too strong supporting, and ensure that when the display panel is subjected to the external pressure, it may effectively resist the external force and recover quickly when the external force is removed.

In an embodiment of the present disclosure, as mentioned above, since the distance between the frame sealant 30 and the display area A is relatively large, as shown in FIGS. 2 and 4, in order to further ensure the cell thickness uniformity between the frame sealant 30 and the display area A, the PS pattern layer may further include at least one peripheral PS group located in the non-display area B in addition to the aforementioned peripheral barrier wall 1053 located in the non-display area B. The peripheral PS group is located at least at a side of the peripheral barrier wall 1053 close to the display area A. Specifically, the peripheral PS group may include a plurality of peripheral PSs 1054 spaced apart from each other along the length direction of the peripheral barrier wall 1053 corresponding to the peripheral PS group. The peripheral PS 1054 may have a pillar shape, and the shape and the width of the support surface thereof may refer to the above description of the main PS 1051 and the auxiliary PS 1052, which will not be repeated herein.

It should be understood that according to an embodiment of the present disclosure, the support surface of the peripheral PS 1054 is also closer to the base substrate 101 than the support surface of the main PS 1051, so as to function as auxiliary support for the non-display area B, and thus prevent the yellowing phenomenon around the display area A due to the uneven cell thickness in the non-display area B and improve the picture quality. That is, after the counter substrate 10 including the peripheral PSs 1054 and the array substrate 20 are assembled together, and when the display panel is not subjected to an external pressure, the main PS 1051 may be supported on the array substrate 20 and compressed to 90% of the original thickness thereof, so as to have a good supporting effect. When the display panel is not subjected to the external pressure, as shown in FIG. 3, there is a distance between the peripheral PS 1053 and the array substrate 20; and when the display panel is subjected to the external pressure, the peripheral PS 1054 may participate in supporting the substrate, and thus effectively resists the external force and quickly recovers when the external force is removed.

In an embodiment of the present disclosure, as shown in FIG. 2, the support surface of the peripheral PS 1054 may be flush with the support surface of the peripheral barrier wall 1053, so that the peripheral PS 1054 and the peripheral barrier wall 1053 may substantially simultaneously participate in supporting the substrate when there is an external pressure, to ensure the uniformity of the entire cell thickness. However, the present disclosure is not limited thereto, the support surface of the peripheral PS 1054 may also be slightly closer to the base substrate 101 than the support surface of the peripheral barrier wall 1053, which depends on specific situations, as long as actual requirements can be met.

In addition, since the external pressure subjected by the display area A is usually greater than the external pressure subjected by the non-display area B, in order that the auxiliary PS 1052 and the peripheral PS 1054 may substantially simultaneously participate in supporting the substrate when the substrate is subjected to the external pressure so that the uniformity of the entire cell thickness may be ensured, the support surface of the peripheral PS 1054 may also be slightly farther from the base substrate 101 than the support surface of the auxiliary PS 1052.

For example, the orthographic projection of the peripheral PS 1054 on the base substrate 101 is located within the orthographic projection of the black matrix pattern layer on the base substrate 101 and outside the orthographic projection of the color filter layer 103 on the base substrate 101.

The standing position of the peripheral PS 1054 and the standing position of the peripheral barrier wall 1053 may be flush with each other, that is, the distance between the peripheral PS 1054 and the base substrate 101 in the thickness direction Z may be equal to the distance between the peripheral barrier wall 1053 and the base substrate 101 in the thickness direction Z. In order that the support surface of the peripheral PS 1054 may be flush with the support surface of the peripheral barrier wall 1053, the peripheral PS 1054 may be designed to have the same thickness as that of the peripheral barrier wall 1053.

For example, in order to further improve the auxiliary support of the peripheral PS group to the non-display area B, in the length direction of the peripheral barrier wall 1053, two ends of each peripheral PS group may be flush with two ends of the corresponding peripheral barrier wall 1053 respectively; optionally, the two ends of each peripheral PS group may extend beyond the two ends of the corresponding peripheral barrier wall 1053 respectively. In other words, the two ends of the peripheral PS group may be farther away from the center of the corresponding peripheral barrier wall 1053 than the two ends of the corresponding peripheral barrier wall 1053. However, the present disclosure is not limited thereto, for example, one end of the peripheral PS group may be flush with one end of the corresponding peripheral barrier wall 1053 and the other end of the peripheral PS group may extend beyond the other end of the peripheral barrier wall 1053, which depends on specific situations, as long as the peripheral PS group may provide the auxiliary support for the non-display area B.

In addition, in the length direction of the peripheral barrier wall 1053, the distance between adjacent peripheral PSs 1054 is equal to the distance between adjacent auxiliary PSs 1052 to ensure the auxiliary support strength of the non-display area B. However, the present disclosure is not limited thereto, and the distance between adjacent peripheral PSs 1054 may also be not equal to the distance between adjacent auxiliary PSs 1052, which depends on specific situations.

For example, as shown in FIG. 4, at least one peripheral PS group is arranged on the non-display area B at each side of the display area A to ensure the support uniformity of the non-display area B.

In an embodiment of the present disclosure, the peripheral PS group may be arranged at both sides of at least part of the peripheral barrier walls 1053 in the width direction thereof to ensure the auxiliary supporting effect of the non-display area B.

The alignment film 104 may be formed on the base substrate 101. Specifically, the alignment film 104 may be formed after the black matrix pattern layer, the color filter layer 103, and the PS pattern layer are formed. It should be noted that the alignment film 104 may be formed by coating the whole layer thereof, and may be located in the display area A and the non-display area B. Therefore, the alignment film 104 may cover the PS pattern layer. It should be understood that as shown in FIG. 2, the alignment film 104 may cover the base substrate 101, the main PS 1051, the auxiliary PS 1052, the peripheral barrier wall 1053, and the peripheral PS 1054.

In an embodiment of the present disclosure, the alignment film 104 may be formed by coating after the PS pattern layer is formed, so that the area of the alignment film 104 may be increased, and thus the area of the alignment film 104 in contact with the liquid crystal may be increased, therefore a better alignment may be provided and the display effect may be improved. It should be noted that the alignment film 104 may also be coated before the PS pattern layer is formed and after the color filter layer 103 is formed. However, the present disclosure is mainly explained by coating the alignment film 104 after the PS pattern layer is formed.

For example, the alignment film 104 may be formed in the following two manners.

The first manner is a non-contact type, also known as inkjet type. In particular, tiny droplets are applied to the surface of a substrate by inkjet printing, and the droplets diffuse freely on the substrate surface to form a film under normal temperature or heated temperature. Such manner has advantages such as liquid-saving, short cycle time, high productivity and the like. However, the test found that due to the low viscosity of the droplet, the diffusion effect is highly dependent on the substrate surface, and further, due to the surface tension, the liquid is difficult to flow into holes, and thus tends to form accumulations on the base substrate 101 in the display area A, which macroscopically appear as uneven display brightness (i.e., Mura phenomenon).

The second manner is a contact type, also known as coater type (coating type). In particular, during the coater coating, alignment film solution (i.e., PI solution) is dropped between a transfer roller and a scraper through a nozzle, and while the transfer roller rotates, the scraper swings to scrape the PI solution on the transfer roller evenly; and the transfer roller is in rotary contact with a transfer printing plate to evenly transfer the PI solution to the transfer printing plate; and the transfer printing plate rotates and contacts the counter substrate 10 on which the PS pattern layer is formed, and transfers the PI solution in the mesh holes of the transfer printing plate onto the surface of the counter substrate by pressure to form a pattern. It should be noted that in an embodiment of the present disclosure, both the diameter of the mesh hole of the transfer printing plate used and the diameter of the protrusion around the mesh hole are about 21 μm, and the depth of the mesh hole is about 16 μm. The coater coating has advantages such as high droplet viscosity, uniform film surface, and low dependence on the substrate. That is, the coater coating may effectively prevent the film thickness unevenness of the alignment film 104 due to the deep hole and high step difference in the display area A. Therefore, the coater coating method is preferred to fabricate the alignment film 104 in the present disclosure.

However, experiments found that although the coater coating may effectively prevent the uneven thickness of the alignment film 104 due to deep hole and high step difference in the display area A, the solution tends to accumulate at the peripheral barrier wall 1053 in the non-display area B. This makes the alignment film 104 at the peripheral barrier wall 1053 thicker, which is directly equivalent to increasing the thickness of the peripheral barrier wall 1053. If the thickness exceeds a certain threshold, the alignment film 104 contacts and supports the array substrate 20 at the position where the peripheral barrier wall 1053 is located when the display panel is not subjected to an external pressure. Since the support density of the peripheral barrier wall 1053 is much greater than the support density of the main PS 1051 in the display area A, it is easy to cause the non-display area B to be too strongly supported, which tends to make the cell thickness in the non-display area B too large. Although the supporting position of the peripheral barrier wall 1053 is in the non-display area B, the cell thickness has a gradually-extended influence, therefore, if the cell thickness is too large, the influence thereof will extend to the edge of the corresponding display area A, as shown in FIG. 5. This makes the difference between the cell thickness at the edge of the display area A and the cell thickness at the inner of the display area A too large, and as actually measured, such difference may reach 0.2 μm or more, which macroscopically appears the yellowing at the edge of the display area.

In view of the above, in order to solve the problem of excessively large cell thickness in the non-display area B, according to an embodiment of the present disclosure, it may prevent the alignment film solution from being accumulated at the peripheral barrier wall 1053.

In particular, during the coater coating, the alignment film solution (i.e., PI solution) is dropped between a transfer roller and a scraper through a nozzle, and while the transfer roller rotates, the scraper swings to scrape the PI solution on the transfer roller evenly; and the transfer roller is in rotary contact with a transfer printing plate to evenly transfer the PI solution to the transfer printing plate; and the transfer printing plate rotates and contacts the counter substrate 10 on which the PS pattern layer is formed, and transfers the PI solution in the mesh holes of the transfer printing plate onto the surface of the counter substrate by pressure to form a pattern. It should be noted that in an embodiment of the present disclosure, both the diameter of the mesh hole of the transfer printing plate used and the diameter of the protrusion around the mesh hole are about 21 μm.

In an embodiment, during transferring the PI solution in the mesh hole of the transfer printing plate to the substrate surface by pressure, the peripheral barrier wall 1053 would squeeze the transfer printing plate to extrude the PI solution out of the mesh hole and into the area where the peripheral barrier wall 1053 is located. Therefore, in order to prevent the problem that the cell thickness is too large at the peripheral barrier wall 1053 due to the excessive accumulation of the PI solution at the peripheral barrier wall 1053, the width W of the peripheral barrier wall 1053 may be adjusted (as shown in FIG. 2), so that the thickness of the alignment film 104 added at the peripheral barrier wall 1053 is smaller than the aforementioned first distance S1 (that is, the distance between the support surface of the peripheral barrier wall 1053 and the support surface of the main PS 1051 in the thickness direction Z of the base substrate 101) or slightly thicker than the first distance S1 by less than 0.1 μm, so as to prevent the cell thickness at the peripheral barrier wall 1053 from being too large due to the too strong supporting at the peripheral barrier wall 1053 when the display panel is not subjected to an external pressure, and thus prevent the problem of yellowing at the edge of the display area.

Figure 6:
FIG. 6 shows a schematic diagram of a relationship between a width of peripheral barrier wall and a thickness of an alignment film thereon in a counter substrate according to an embodiment of the present disclosure.

When the coater coating is performed by using the aforementioned transfer printing plate, the inventor found through a large number of calculations and experiments that the thickness of the alignment film 104 on the peripheral barrier wall 1053 and the width W of the peripheral barrier wall 1053 may have a relationship shown in FIG. 6. It should be noted that the abscissa in FIG. 6 represents the width W of the peripheral barrier wall 1053 in micrometers (μm), and the ordinate in FIG. 6 represents the thickness of the alignment film 104 on the peripheral barrier wall 1053 in angstroms (Å). Specifically, referring to FIG. 6, when the width W of the peripheral barrier wall 1053 is 32 μm, the thickness of the alignment film 104 on the peripheral barrier wall 1053 may be 3227 Å (i.e., approximately equal to 0.32 μm); when the width W of the peripheral barrier wall 1053 is 21 μm, the thickness of the alignment film 104 on the peripheral barrier wall 1053 may be 2104 Å (i.e., approximately equal to 0.21 μm); when the width W of the peripheral barrier wall 1053 is 15 μm, the thickness of the alignment film 104 on the peripheral barrier wall 1053 may be 1514 Å (i.e., approximately equal to 0.15 μm); when the width W of the peripheral barrier wall 1053 is 12 μm, the thickness of the alignment film 104 on the peripheral barrier wall 1053 may be 1245 Å (i.e., approximately equal to 0.12 μm), that is, the thickness of the alignment film 104 on the peripheral barrier wall 1053 and the width W of the peripheral barrier wall 1053 may have a proportional relationship, and the proportionality coefficient thereof may be 100.

Based on the aforementioned relationship between the thickness of the alignment film 104 on the peripheral barrier wall 1053 and the width W of the peripheral barrier wall 1053, when the distance (i.e., the first distance S1) between the support surface of the peripheral barrier wall 1053 and the support surface of the main PS 1051 in the thickness direction Z of the base substrate 101 remains unchanged, the width W of the peripheral barrier wall 1053 may be adjusted in an embodiment of the present disclosure, so that the ratio between the width W of the peripheral barrier wall 1053 and the first distance S1 may be less than 100, and thus the thickness of the alignment film 104 added at the peripheral barrier wall 1053 is smaller than the aforementioned first distance S1 or slightly thicker than the first distance S1 by less than 0.1 μm, so as to prevent the cell thickness at the peripheral barrier wall 1053 from being too large due to the too strong supporting at the peripheral barrier wall 1053 when the display panel is not subjected to an external pressure, and thus prevent the problem of yellowing at the edge of the display area.

It should be noted that when the width W of the peripheral barrier wall 1053 is close to or exceeds the distance between adjacent mesh holes of the transfer printing plate (i.e., the width of the protrusion), that is, the width W of the peripheral barrier wall 1053 is 20 μm or more, two adjacent mesh holes tends to be squeezed by the same peripheral barrier wall 1053, so that the PI solution in the adjacent two mesh holes would accumulate at this peripheral barrier wall 1053, which will easily cause the alignment film 104 at the peripheral barrier wall 1053 to have a thickness of 0.2 μm or more. Therefore, in order to further prevent the cell thickness at the peripheral barrier wall 1053 from being too large due to the too strong supporting at the peripheral barrier wall 1053 when the display panel is not subjected to an external pressure, when the first distance S1 is 0.2 μm to 0.5 μm, the width W of the peripheral barrier wall 1053 may be designed to be less than or equal to 15 μm. In addition, in order to ensure the auxiliary support effect of the peripheral barrier wall 1053, the width W of the peripheral barrier wall 1053 may not be too small. In an embodiment of the present disclosure, the width W of the peripheral barrier wall 1053 is designed to be greater than or equal to 10 μm, that is, the width W of the peripheral barrier wall 1053 may be 10 μm to 15 μm, such as 10 μm, 11 μm, 12 μm, 13 μm, 14 μm, 15 μm, and the like. In an embodiment of the present disclosure, the width W of the peripheral barrier wall 1053 may be designed to be less than or equal to 12 μm.

It should be understood that the width W of the peripheral barrier wall 1053 is not limited to the above-mentioned value range, and the other values are possible as long as it may ensure the supporting effect and at the same time prevent the cell thickness from being too large. The length of the peripheral barrier wall 1053 may depend on the size of the display panel, and is generally several hundred millimeters. In an embodiment of the present disclosure, the thicknesses of the main PS 1051, the peripheral barrier wall 1053, and the peripheral PS 1054 may be 3 μm, and the thickness of the auxiliary PS 1052 may be slightly less than 3 μm, however the present disclosure is not limited thereto. The specific thicknesses of the main PS 1051, the auxiliary PS 1052, the peripheral barrier wall 1053, and the peripheral PS 1054 may be determined according to the actual cell thickness requirements.

In an embodiment of the present disclosure, in order to further prevent the cell thickness at the peripheral barrier wall 1053 from being too large due to the excessive accumulation of PI solution at the peripheral barrier wall 1053, the distance between the peripheral barrier wall 1053 and the peripheral PS group adjacent thereto may also be adjusted. Specifically, the distance between at least part of the peripheral PSs 1054 in each peripheral PS group and the peripheral barrier wall 1053 adjacent thereto is the second distance S2, as shown in FIG. 2.

Figure 7:
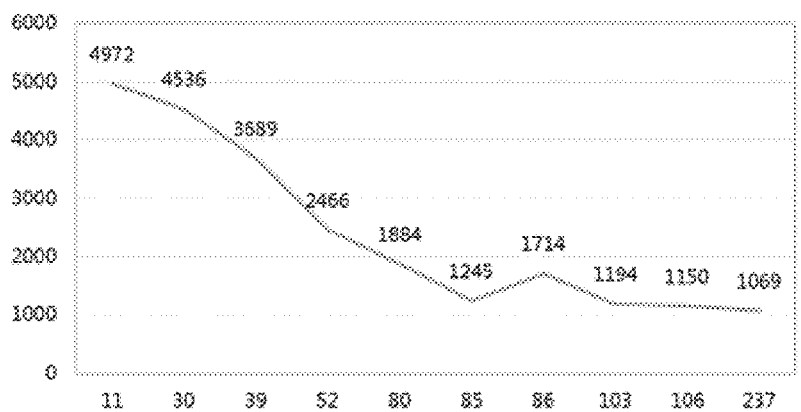
FIG. 7 shows a schematic diagram of a relationship between a second distance and a thickness of an alignment film on a peripheral barrier wall in a counter substrate according to an embodiment of the present disclosure.

When the coater coating is performed by using the aforementioned transfer printing plate, the inventor found through a large number of calculations and experiments that the thickness of the alignment film 104 on the peripheral barrier wall 1053 and the second distance S2 may have a relationship shown in FIG. 7. It should be noted that the abscissa in FIG. 7 represents the second distance S2 in micrometers (μm), and the ordinate in FIG. 7 represents the thickness of the alignment film 104 on the peripheral barrier wall 1053 in angstroms (Å). Specifically, referring to FIG. 7, when the width of the second distance S2 is 11 μm, the thickness of the alignment film 104 on the peripheral barrier wall 1053 may be 4972 Å (i.e., approximately equal to 0.50 μm). When the width of the second distance S2 is 30 μm, the thickness of the alignment film 104 on the peripheral barrier wall 1053 may be 4536 Å (i.e., approximately equal to 0.45 μm). When the width of the second distance S2 is 39 μm, the thickness of the alignment film 104 on the peripheral barrier wall 1053 may be 3689 Å (i.e., approximately equal to 0.37 μm). When the width of the second distance S2 is 52 μm, the thickness of the alignment film 104 on the peripheral barrier wall 1053 may be 2466 Å (i.e., approximately equal to 0.25 μm). When the width of the second distance S2 is 80 μm, the thickness of the alignment film 104 on the peripheral barrier wall 1053 may be 1884 Å (i.e., approximately equal to 0.19 μm). When the width of the second distance S2 is 85 μm, the thickness of the alignment film 104 on the peripheral barrier wall 1053 may be 1245 Å (i.e., approximately equal to 0.12 μm). When the width of the second distance S2 is 86 μm, the thickness of the alignment film 104 on the peripheral barrier wall 1053 may be 1714 Å (i.e., approximately equal to 0.17 μm). When the width of the second distance S2 is 103 μm, the thickness of the alignment film 104 on the peripheral barrier wall 1053 may be 1194 Å (i.e., approximately equal to 0.12 μm). When the width of the second distance S2 is 106 μm, the thickness of the alignment film 104 on the peripheral barrier wall 1053 may be 1150 Å (i.e., approximately equal to 0.12 μm). When the width of the second distance S2 is 237 μm, the thickness of the alignment film 104 on the peripheral barrier wall 1053 may be 1069 Å (i.e., approximately equal to 0.11 μm).

In view of the above, when the peripheral PS 1054 is too close to the peripheral barrier wall 1053, that is, the second distance S2 is too small, the peripheral PS 1054 may prevent the PI solution at the peripheral barrier wall 1053 from spreading to the surroundings. As a result, the alignment film 104 at the peripheral barrier wall 1053 and the peripheral PS 1054 is likely to be too thick. Therefore, in order to prevent the cell thickness at the peripheral barrier wall 1053 and the peripheral PS 1054 from being too large due to the excessive accumulation of PI solution at the peripheral barrier wall 1053 and the peripheral PS 1054, when the distance between the support surface of the peripheral barrier wall 1053 and the support surface of the main PS 1051 in the thickness direction Z of the base substrate 101 (i.e., the first distance S1) remains unchanged, the distance between the peripheral PS 1054 and the peripheral barrier wall 1053 may be adjusted so that the thickness of the alignment film 104 at the peripheral barrier wall 1053 and the peripheral PS 1054 is smaller than the aforementioned first distance S1 (i.e., the distance between the support surface of the peripheral barrier wall 1053 and the support surface of the main PS 1051 in the thickness direction Z of the base substrate 101) or slightly thicker than the first distance S1 by less than 0.1 μm.

Specifically, in view of that shown in FIG. 7, the ratio between the distance between the peripheral PS 1054 and the peripheral barrier wall 1053 and the distance between the support surface of the peripheral barrier wall 1053 and the support surface of the main PS 1051 in the thickness direction Z of the base substrate 101 may be greater than 400, that is, the ratio between the second distance S2 and the first distance S1 is greater than 400, so that the thickness of the alignment film 104 at the peripheral barrier wall 1053 and the peripheral PS 1054 is smaller than the aforementioned first distance S1 or slightly thicker than the first distance S1 by less than 0.1 μm, which may prevent the cell thickness at the peripheral barrier wall 1053 from being too large due to too strong supporting at the peripheral barrier wall 1053 and the peripheral PS 1054 when the display panel is not subjected to an external pressure, and thus may solve the problem of yellowing at the display edge.

As shown in FIG. 7, when the second distance S2 is less than 50 μm, the thickness of the alignment film 104 at the peripheral barrier wall 1053 is larger than 0.2 μm, and when the second distance S2 is not less than 80 μm, the thickness of the alignment film 104 at the peripheral barrier wall 1053 is smaller than 0.2 μm. Therefore, when the aforementioned first distance S1 is 0.2 μm to 0.5 μm, in order to further prevent the cell thickness at the peripheral barrier wall 1053 from being too large due to the too strong supporting at the peripheral barrier wall 1053 when the display panel is not subjected to an external pressure, the second distance S2 may be designed to be 80 μm or more. In addition, in order to ensure the support uniformity, the distance between the peripheral wall 1053 and the peripheral PS 1054 may be not too large, the second distance S2 may be specifically designed to be no greater than 100 μm, that is, the second distance S2 according to an embodiment of the present disclosure may be 80 μm to 100 μm, such as 80 μm, 85 μm, 90 μm, 95 μm, 100 μm, and the like. In an embodiment of the present disclosure, the second distance S2 may be designed to be not less than 90 μm.

It should be understood that the second distance S2 is not limited to the above-mentioned value range, and the other values are possible as long as it may ensure the supporting effect and at the same time prevent the cell thickness from being too large.

In an embodiment of the present disclosure, when the orthographic projection of the peripheral barrier wall 1053 on the base substrate 101 is rectangular, the distance between the peripheral barrier walls 1053 and each of the peripheral PSs 1054 in the peripheral PS group corresponding to the peripheral barrier wall 1053 may be the second distance S2. However, the present disclosure is not limited thereto, and the peripheral barrier wall 1053 may also be partially bent towards a direction away from the peripheral PS 1054, so that the distance therebetween may reach the aforementioned second distance S2, which depends on specific situations.

It should be noted that in an embodiment of the present disclosure, the thickness of the alignment film 104 on a sub-pixel area of the counter substrate 10 may be about 0.1 μm, and the thickness of the alignment film 104 on the main PS 1051 and the auxiliary PS 1052 may be a few hundredths of a micrometer.

In addition, it should be noted that according to an embodiment of the present disclosure, the counter substrate 10 is not limited to include the aforementioned film layer structure, and may further include a transparent protective layer. The transparent protective layer may be formed after the color filter layer 103 is formed and before the PS pattern layer is formed. The transparent protective layer is entirely arranged in the display area A and the non-display area B to protect the color filter layer 103 and the black matrix pattern layer.

An embodiment of the present disclosure also provides a display panel, as shown in FIG. 3, which includes the counter substrate 10 described in any of the foregoing embodiments, which will not be repeated here, and may also include the array substrate 20 which is assembled together with the counter substrate 10. The part of the alignment film 104 of the counter substrate 10 corresponding to the main PS 1051 is in contact with the array substrate 20; and there is a gap between the part of the alignment film 104 of the counter substrate 10 corresponding to the peripheral barrier wall 1053 and the array substrate 20.

It should be understood that according to an embodiment of the present disclosure, the display panel may be a liquid crystal display panel. That is, as shown in FIG. 3, the display panel may further include a frame sealant 30 and a liquid crystal (not shown). The frame sealant 30 may be arranged between the counter substrate 10 and the array substrate 20. The frame sealant 30 is located in the non-display area B and surrounds the display area A. and is located at the side of the peripheral barrier wall 1053 away from the display area A. The liquid crystal may be filled in the area enclosed by the frame sealant 30, the counter substrate 10, and the array substrate 20. The liquid crystal may be a positive liquid crystal or a negative liquid crystal.

It should be noted that the orthographic projection of the frame sealant 30 on the base substrate 101 may be located within the orthographic projection of the black matrix pattern layer (i.e., the second shielding portion 1022) on the base substrate 101.

For example, according to an embodiment of the present disclosure, the display panel may be rectangular as a whole. That is, the display panel may include a DP side (the side where a source driver is provided) and a DPO side (the side opposite to the DP side in a column direction) arranged in the column direction and a GL side and a GR side arranged oppositely in a row direction. The GL side and the GR side are the sides where a gate drive circuit is provided.

Figure 8:
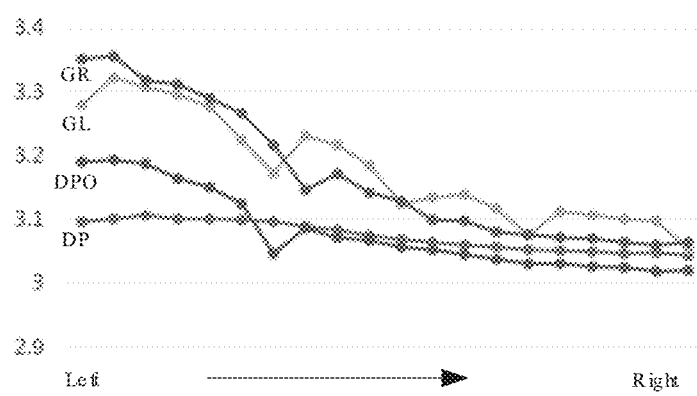
FIG. 8 shows a schematic diagram of a change of a cell thickness at each side of a display panel from a side of a display area to a center thereof according to an embodiment of the present disclosure.
Figure 9:
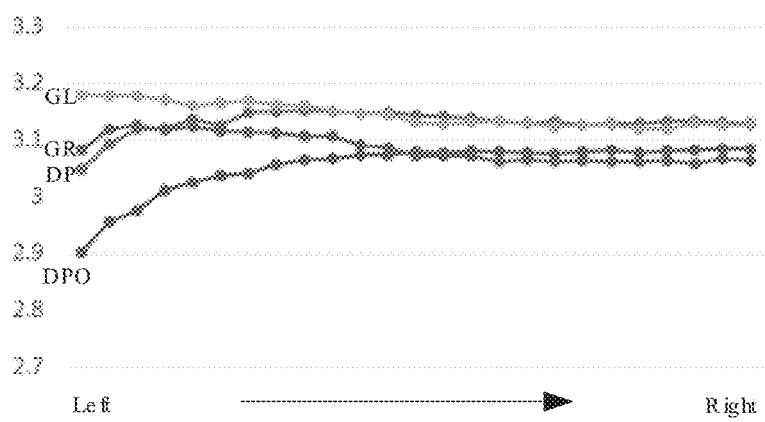
FIG. 9 shows a schematic diagram of a change of a cell thickness at each side of a display panel from a side of a display area to a center thereof according to another embodiment of the present disclosure.

FIG. 8 shows a change of the cell thickness at each of the DP side, DPO side, GL side and GR side of the display panel from a side of the display area A to a center thereof when the width W of the peripheral barrier wall 1053 is 15 μm and the distance between the peripheral barrier wall 1053 and the peripheral PS 1054 is 15 µm to 30 µm, and FIG. 9 shows a change of the cell thickness at each of the DP side, DPO side, GL side and GR side of the display panel from a side of the display area A to a center thereof when the width W of the peripheral barrier wall 1053 is 12 µm and the distance between the peripheral barrier wall 1053 and the peripheral PS 1054 is greater than 90 µm. It should be noted that, the direction from left to right on the abscissa in FIGS. 8 and 9 refers to the direction from the side to the inside of the display area A. and the ordinate in FIGS. 8 and 9 refers to the cell thickness in micrometers (µm).

FIG. 8 shows that the cell thickness of the edge of the display area A at each of the DP side, DPO side, GL side, and GR side of the display panel is higher than the cell thickness at the center of the display panel by 0.2 µm or more, and the yellowing level is positively correlated with the cell thickness difference. That is to say, the greater the cell thickness difference, the higher the yellowing level. The yellowing level at the edge of the display area A in FIG. 8 is 2. FIG. 9 shows that the cell thickness of the edge of the display area A at each of the DP side, DPO side, GL side, and GR side of the display panel is higher than the cell thickness at the center of the display panel by less than 0.1 µm or slightly lower than the cell thickness at the center of the display panel (according to the experiences, the "slightly lower" will not cause defects), and the yellowing level is less than 0.5 (when the yellowing level is no more than 1, the product requirements can be met). That is, in view of FIGS. 8 and 9, according to an embodiment of the present disclosure, the width W of the peripheral barrier wall 1053 may be not greater than 12 µm, the distance between the peripheral barrier wall 1053 and the peripheral PS 1054 may be not less than 90 µm, which at the same time can ensure the support effect of the peripheral barrier wall 1053 and the peripheral PS 1054.

An embodiment of the present disclosure also provides an electronic apparatus, which includes the display panel described in any of the foregoing embodiments.

It should be noted that, in addition to the aforementioned display panel, the electronic apparatus may also include other parts and components, such as polarizer, backlight module, battery, motherboard, housing and the like, which can be added by those skilled in the art according to the specific usage requirements of the electronic apparatus, which will not be repeated herein.

In an embodiment of the present disclosure, the specific type of the electronic apparatus is not particularly limited, and may include any type of electronic devices commonly used in the art, such as TV, mobile phone, computer, medical equipment and the like, which may be selected by those skilled in the art according to a specific purpose of the apparatus, and will not be repeated herein.

Those skilled in the art will easily conceive of other embodiments of the present disclosure after considering the specification and practicing the content disclosed herein. The present disclosure is intended to cover any variations, uses, or adaptive changes of the present disclosure, which follow the general principles of the present disclosure and include common knowledge or conventional technical means in the technical field that are not disclosed in the present disclosure. The description and the embodiments are only regarded as exemplary, and the true scope and spirit of the present disclosure are pointed out by the appended claims.

What is claimed is:

1. A counter substrate comprising a display area and a non-display area arranged around the display area, wherein the counter substrate comprises a base substrate, a photo spacer (PS) pattern layer formed on the base substrate and an alignment film covering the PS pattern layer, a surface of the PS pattern layer away from the base substrate is a support surface, and the PS pattern layer comprises:
   a plurality of main PSs, located in the display area, and each having a pillar shape;
   at least one peripheral barrier wall, located in the non-display area and arranged at at least one side of the display area, the peripheral barrier wall substantially having an elongated-strip shape and having a same length direction as that of a display area side, corresponding to the peripheral barrier wall, of the display area, the support surface of the peripheral barrier wall being closer to the base substrate than the support surface of the main PS, and a distance between the support surface of the peripheral barrier wall and the support surface of the main PS in a thickness direction of the base substrate being a first distance; and
   at least one first peripheral PS group, arranged on the non-display area, the first peripheral PS group being located at least at a side of the peripheral barrier wall away from the display area and comprising a plurality of first peripheral PSs spaced apart from each other along the length direction of the peripheral barrier wall corresponding to the first peripheral PS group, and the first peripheral PS having a pillar shape,
   wherein the PS pattern layer further comprises:
   at least one second peripheral PS group, arranged on the non-display area, the second peripheral PS group being located at least at a side of the peripheral barrier wall close to the display area,
   wherein the second peripheral PS group comprises a plurality of second peripheral PSs spaced apart from each other along the length direction of the peripheral barrier wall corresponding to the second peripheral PS group, the second peripheral PS has a pillar shape, and the support surface of the second peripheral PS and the support surface of the peripheral barrier wall are in a same plane.

2. The counter substrate according to claim 1, wherein the first distance is in a range of 0.2 µm to 0.5 µm.

3. The counter substrate according to claim 2, wherein the width of the support surface of the peripheral barrier wall is in a range of 10 µm to 15 µm.

4. The counter substrate according to claim 1, wherein a ratio between a width of the support surface of the peripheral barrier wall and the first distance is less than 100.

5. The counter substrate according to claim 1, wherein
   a distance between at least part of the second peripheral PSs in each of the at least one second peripheral PS group and the peripheral barrier wall corresponding to the second peripheral PSs is a second distance, and
   a ratio between the second distance and the first distance is greater than 400.

6. The counter substrate according to claim 5, wherein the second distance is in a range of 80 µm to 100 µm.

7. The counter substrate according to claim 5, wherein an orthographic projection of the peripheral barrier wall on the base substrate is a rectangle, and the distance between the peripheral barrier wall and each of the second peripheral PSs in the second peripheral PS group corresponding to the peripheral barrier wall.

8. The counter substrate according to claim 1, wherein
in the length direction of the peripheral barrier wall, two ends of the peripheral barrier wall are respectively flush with two ends of the display area side corresponding to the peripheral barrier wall, or the two ends of the peripheral barrier wall respectively extend beyond the two ends of the display area side corresponding to the peripheral barrier wall; and
in the length direction of the peripheral barrier wall, two ends of each of the at least one second peripheral PS group are respectively flush with the two ends of the peripheral barrier wall corresponding to the second peripheral PS group, or the two ends of each of the at least one second peripheral PS group respectively exceed beyond the two ends of the peripheral barrier wall corresponding to the second peripheral PS group.

9. The counter substrate according to claim 1, wherein the at least one peripheral barrier wall and the at least one second peripheral PS group are arranged on the non-display area at each display area side of the display area.

10. The counter substrate according to claim 1 wherein the PS pattern layer further comprises:
a plurality of auxiliary PSs, located in the display area, the auxiliary PS having a pillar shape, and the support surface of the auxiliary PS being closer to the base substrate than the support surface of the main PS,
wherein a number of the auxiliary PSs is greater than that of the main PSs.

11. The counter substrate according to claim 10, wherein in the length direction of the peripheral barrier wall, a distance between adjacent ones of the second peripheral PSs is equal to that between adjacent ones of the auxiliary PSs.

12. The counter substrate according to claim 10, wherein in the thickness direction of the base substrate, thicknesses of the main PS, the second peripheral PS, and the peripheral barrier wall are the same and greater than a thickness of the auxiliary PS.

13. The counter substrate according to claim 12, further comprising a black matrix pattern layer and a color filter layer, wherein
the black matrix pattern layer is arranged between the base substrate and the PS pattern layer, and the color filter layer is arranged between the black matrix pattern layer and the PS pattern layer;
orthographic projections of the peripheral barrier wall and the second peripheral PSs on the base substrate are located in an orthographic projection of the black matrix pattern layer on the base substrate and outside an orthographic projection of the color filter layer on the base substrate; and
orthographic projections of the main PSs and the auxiliary PSs on the base substrate are located in the orthographic projection of the black matrix pattern layer on the base substrate and in the orthographic projection of the color filter layer on the base substrate.

14. A display panel comprising a counter substrate and an array substrate assembled together, wherein the counter substrate comprises display area and a non-display area arranged around the display area, and wherein the counter substrate comprises a base substrate, a photo spacer (PS) pattern layer formed on the base substrate and an alignment film covering the PS pattern layer, a surface of the PS pattern layer away from the base substrate is a support surface, and the PS pattern layer comprises:
a plurality of main PSs, located in the display area, and each having a pillar shape;
at least one peripheral barrier wall, located in the non-display area and arranged at at least one side of the display area, the peripheral barrier wall substantially having an elongated-strip shape and having a same length direction as that of a display area side, corresponding to the peripheral barrier wall, of the display area, the support surface of the peripheral barrier wall being closer to the base substrate than the support surface of the main PS, and a distance between the support surface of the peripheral barrier wall and the support surface of the main PS in a thickness direction of the base substrate being a first distance; and
at least one first peripheral PS group, arranged on the non-display area, the first peripheral PS group being located at least at a side of the peripheral barrier wall away from the display area and comprising a plurality of first peripheral PSs spaced apart from each other along the length direction of the peripheral barrier wall corresponding to the first peripheral PS group, and the first peripheral PS having a pillar shape,
wherein the PS pattern layer further comprises:
at least one second peripheral PS group, arranged on the non-display area, the second peripheral PS group being located at least at a side of the peripheral barrier wall close to the display area,
wherein the second peripheral PS group comprises a plurality of second peripheral PSs spaced apart from each other along the length direction of the peripheral barrier wall corresponding to the second peripheral PS group, the second peripheral PS has a pillar shape, and the support surface of the second peripheral PS and the support surface of the peripheral barrier wall are in a same plane.

15. The display panel according to claim 14, wherein
a part of the alignment film of the counter substrate corresponding to the main PS is in contact with the array substrate; and
a gap is provided between a part of the alignment film of the counter substrate corresponding to the peripheral barrier wall and the array substrate.

16. The display panel according to claim 14, further comprising:
a frame sealant, arranged between the counter substrate and the array substrate and in the non-display area, surrounding the display area, and located at a side of the peripheral barrier wall away from the display area; and
liquid crystal, filled in an area enclosed by the frame sealant, the counter substrate and the array substrate.

17. The display panel according to claim 14, wherein the first distance is in a range of 0.2 μm to 0.5 μm.

18. The display panel according to claim 14, wherein the width of the support surface of the peripheral barrier wall is in a range of 10 μm to 15 μm.

19. The display panel according to claim 14, wherein a ratio between a width of the support surface of the peripheral barrier wall and the first distance is less than 100.

20. The display panel according to claim 14, wherein
a distance between at least part of the second peripheral PSs in each of the at least one second peripheral PS group and the peripheral barrier wall corresponding to the second peripheral PSs is a second distance, and
a ratio between the second distance and the first distance is greater than 400.

* * * * *